(12) United States Patent
Brown et al.

(10) Patent No.: US 10,025,758 B2
(45) Date of Patent: Jul. 17, 2018

(54) SUPPORT FOR NON-NATIVE FILE TYPES IN WEB APPLICATION ENVIRONMENT

(71) Applicant: MICROSOFT TECHNOLOGY LICENSING, LLC, Redmond, WA (US)

(72) Inventors: Dorrene Brown, Redmond, WA (US); Joey Masterson, Issaquah, WA (US); Nate Waddoups, Redmond, WA (US); Shreedhar Thirugnanasambantham, Redmond, WA (US); Xiao Wu, Redmond, WA (US); Jay Rathi, Kirkland, WA (US); Mauricio Ordonez, Bellevue, WA (US); Darren Miller, Redmond, WA (US); Ela Malani, Redmond, WA (US); John Wang, Redmond, WA (US); Sreekanth Lingannapeta, Redmond, WA (US); Gabriel Hall, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 321 days.

(21) Appl. No.: 14/855,512

(22) Filed: Sep. 16, 2015

(65) Prior Publication Data

US 2016/0313882 A1 Oct. 27, 2016

Related U.S. Application Data

(60) Provisional application No. 62/153,436, filed on Apr. 27, 2015.

(51) Int. Cl.
*G06F 17/21* (2006.01)
*G06F 3/0484* (2013.01)
(Continued)

(52) U.S. Cl.
CPC .......... *G06F 17/212* (2013.01); *G06F 3/0484* (2013.01); *G06F 9/451* (2018.02);
(Continued)

(58) Field of Classification Search
CPC ...................................................... G06F 17/212
See application file for complete search history.

(56) References Cited

U.S. PATENT DOCUMENTS 6,742,176 B1    5/2004  Million et al.
6,895,591 B1 *  5/2005  Russ ................. G06F 17/30067
                                                          707/999.01

(Continued)

OTHER PUBLICATIONS

Hiskey, Robert, "In Real Life, I Talk About a Lot of Things. On this Blog, I mostly just talk about SharePoint and UX.", Published on: May 3, 2012 Available at: http://www.roberthiskey.com/2012/05/setting-permissive-handling-for.html.

(Continued)

*Primary Examiner* — William Bashore
*Assistant Examiner* — Nathan Shrewsbury
(74) *Attorney, Agent, or Firm* — Turk IP Law, LLC

(57) ABSTRACT

Applications may be created and registered to an online ecosystem and then execute within individual web applications such as productivity applications, communication applications, collaboration applications, and so on. These non-native applications may be enabled to interact with files and provide custom experiences for a user. The applications may also be enabled to interact with additional information discovered about the user within the ecosystem to provide custom experiences. The applications may further be enabled to create custom workflows to allow users to accomplish new tasks.

19 Claims, 7 Drawing Sheets

(51) Int. Cl.
*H04L 29/08* (2006.01)
*G06F 17/30* (2006.01)
*G06F 9/451* (2018.01)
*G06F 3/0481* (2013.01)

(52) U.S. Cl.
CPC ........ *G06F 17/30896* (2013.01); *H04L 67/02* (2013.01); *H04L 67/06* (2013.01); *G06F 3/04817* (2013.01)

(56) References Cited

U.S. PATENT DOCUMENTS

| | | | |
|---|---|---|---|
| 7,409,644 B2* | 8/2008 | Moore | G06F 3/0481 715/774 |
| 7,509,374 B2 | 3/2009 | Trinh et al. | |
| 7,761,427 B2 | 7/2010 | Martin et al. | |
| 7,792,881 B2 | 9/2010 | Forstall et al. | |
| 8,589,955 B2 | 11/2013 | Roundtree et al. | |
| 8,689,235 B2 | 4/2014 | Cookson | |
| 8,839,233 B2 | 9/2014 | Kaegi | |
| 9,317,683 B2* | 4/2016 | Jalon | G06F 21/53 |
| 9,535,883 B2* | 1/2017 | Pan | G06F 17/211 |
| 9,740,874 B2* | 8/2017 | Mahkovec | G06F 21/6218 |
| 2006/0070029 A1* | 3/2006 | Laborczfalvi | G06F 9/44505 717/120 |
| 2006/0080468 A1 | 4/2006 | Vadlamani et al. | |
| 2006/0106822 A1* | 5/2006 | Lee | G06F 17/212 |
| 2006/0248038 A1* | 11/2006 | Kaplan | G06F 17/3012 |
| 2010/0011301 A1* | 1/2010 | Binyamin | H04L 67/16 715/748 |
| 2011/0022643 A1* | 1/2011 | Jalon | G06F 21/53 707/805 |
| 2011/0209064 A1 | 8/2011 | Jorgensen et al. | |
| 2011/0282709 A1 | 11/2011 | Rangaswamy et al. | |
| 2012/0081375 A1* | 4/2012 | Robert | G06F 17/30126 345/522 |
| 2012/0084644 A1* | 4/2012 | Robert | G06F 9/4443 715/255 |
| 2012/0084688 A1* | 4/2012 | Robert | G06F 3/04817 715/769 |
| 2012/0233668 A1 | 9/2012 | Leafe et al. | |
| 2012/0327009 A1* | 12/2012 | Fleizach | G06F 3/04883 345/173 |
| 2013/0219211 A1* | 8/2013 | Gopinath | G06F 11/1482 714/3 |
| 2013/0219322 A1* | 8/2013 | Cranfill | G06F 17/30011 715/776 |
| 2014/0032691 A1* | 1/2014 | Barton | H04L 41/00 709/206 |
| 2014/0236663 A1 | 8/2014 | Smith et al. | |
| 2015/0092233 A1* | 4/2015 | Park | G06F 3/1288 358/1.15 |
| 2015/0154156 A1* | 6/2015 | Meyers, Jr. | G06F 17/2235 715/205 |
| 2015/0163261 A1* | 6/2015 | Mahkovec | G06F 21/6218 709/204 |
| 2015/0212765 A1* | 7/2015 | Uchida | G06F 3/1208 358/1.15 |
| 2015/0347104 A1* | 12/2015 | Goossens | G06F 9/44526 717/151 |

OTHER PUBLICATIONS

"Customize which File Types Open in Office Web Apps", Retrieved on: Mar. 19, 2015 Available at: https://harmon.ie/KB/customize-which-file-types-open-office-web-apps.

"Applications Panel—Set How Firefox Handles Different Types of Files", Published on: Mar. 4, 2015 Available at: https://support.mozilla.org/en-US/kb/applications-panel-set-how-firefox-handles-files.

* cited by examiner

SUPPORT FOR NON-NATIVE FILE TYPES IN WEB APPLICATION ENVIRONMENT

CROSS-REFERENCE TO RELATED APPLICATION

This application is a non-provisional under 35 U.S.C. § 119(e) of U.S. Provisional Application No. 62/153,436 filed on Apr. 27, 2015. The U.S. Provisional Application is herein incorporated by reference in its entirety.

BACKGROUND

People interact with computer applications through user interfaces. While audio, tactile, and similar forms of user interfaces are available, visual user interfaces through a display device are the most common form of a user interface. With the development of faster and smaller electronics for computing devices, smaller size devices such as handheld computers, smart phones, tablet devices, and comparable devices have become common. Such devices execute a wide variety of applications ranging from communication applications to productivity applications. Many such applications are part of a web-based environment, where users may access applications and services through thin clients.

Users may not be able to interact with the files they care about within the web applications and perform custom actions as determined by the developer. In some web-based services, there may be thousands of file types sent/received/shared in the online ecosystem, for which there may be limited ways to preview and interact with the files.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing support for non-native file, types in web application environment. In some examples, a file handler application may be registered with a directory service associated with the web application environment, where the file handler application is used to integrate a non-native file to the web application environment such that the non-native file is handled in a similar way to native files. A file handler manifest may be declared that includes one or more file handler application properties. One or more file handler application resources associated with previewing, opening, creating, printing, and saving the non-native file may be created and deployed. The one or more file handler application resources may be associated with the directory service. Moreover, one application may contain multiple file handlers and a file handler may deal with one or more extensions at the same time.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
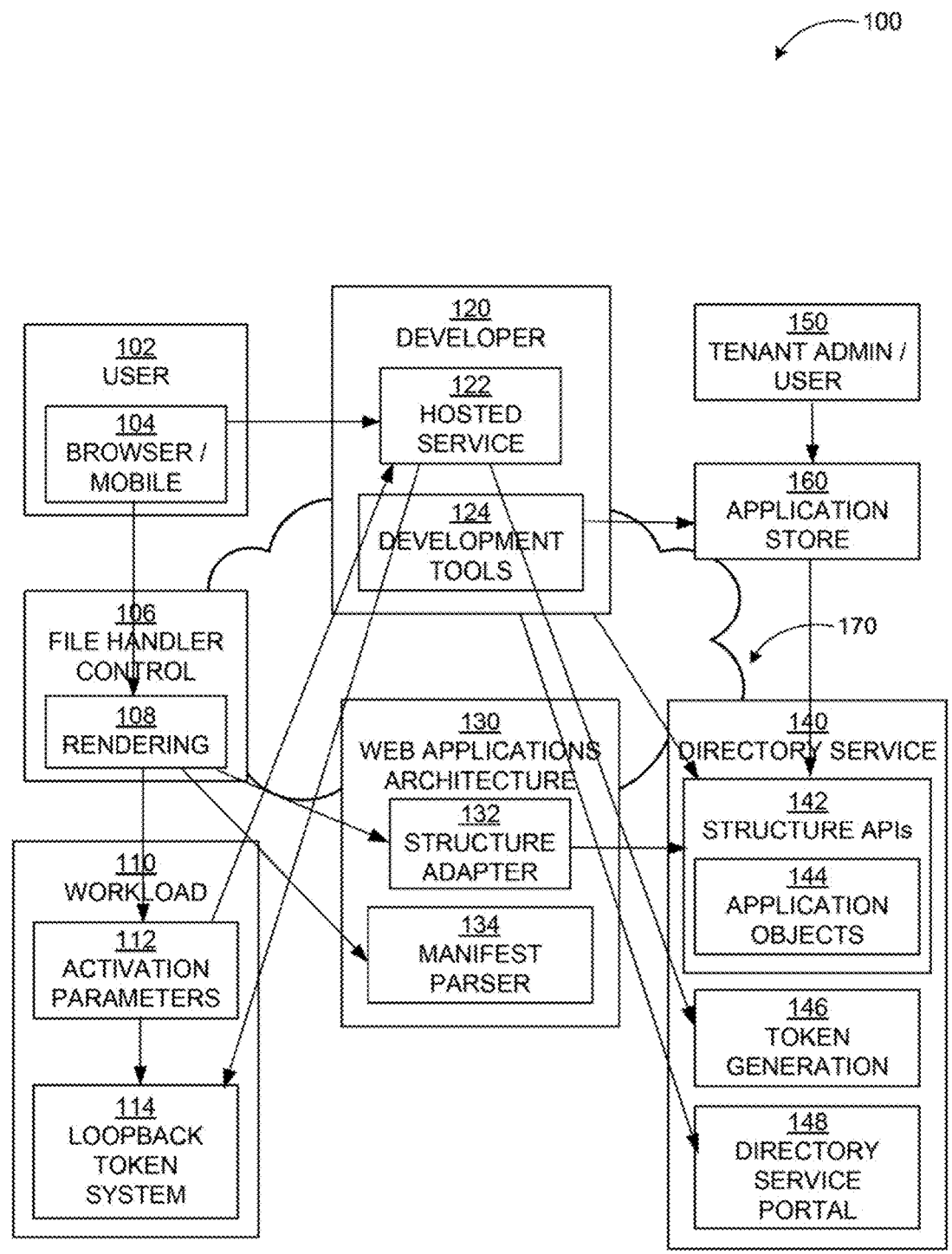
FIG. 1 includes an example architecture of an environment where support for non-native file types for web applications may be implemented.

As briefly described above, developers may be enabled to create custom applications to allow users to be able to interact with the otherwise unknown files and perform custom actions based on the applications capabilities. Applications may be created and registered to an online ecosystem and then execute within the individual applications such as those part of a productivity suite or a collaboration service. The applications may be able to interact with files and provide custom experiences for the user such as providing interactive previews. The applications may also be able to interact with additional information discovered about the user to provide custom experiences. The applications may be allowed to create custom workflows to allow users to accomplish new tasks. In some examples, one application may contain multiple file handlers and a file handler may deal with one or more extensions at the same time In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing, devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing support for non-native file types in web application environment. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

While example implementations are described using, specific file types and configurations herein, embodiments are not limited to the specific examples. Support for non-native file types for web applications may be implemented with other file types and configurations.

The technical advantages of providing support for non-native file types for web applications may include increased efficiency in network usage (reduced communication traffic by avoiding a need to install a non-native application each time), reduced data storage demand (reduction of overhead associated with non-native files and applications), improved user interaction efficiency (experiencing non-native files in a similar fashion to native files), and enhanced security (allowing non-native files to be processed through the security infrastructure of the web application ecosystem.

Embodiments address a need that arises from very large scale of operations created by networked computing and cloud based services that cannot be managed by humans. The actions/operations described herein are not a mere use of a computer, but address results of a system that is a direct consequence of software used as a service such as communication services offered in conjunction with attachments.

FIG. 1 includes an example architecture of an environment where support for non-native file types for web applications may be implemented.

In a system according to embodiments, applications may be created and registered to an online ecosystem and then execute within individual web applications such as productivity applications, communication applications, collaboration applications, and so on. These non-native applications may be enabled to interact with files and provide custom experiences for a user. The applications may also be enabled to interact with additional information discovered about the user within the ecosystem to provide custom experiences. The applications may further be enabled to create custom workflows to allow users to accomplish new tasks.

Diagram 100 shows an example ecosystem, where a developer 120 may utilize a hosted service 122 and development tools 124 to create applications that will execute within or in conjunction with web applications within the ecosystem. The ecosystem may include a number of services and web applications that are supported by a common architecture and support services such as directory service 140. Created applications may be made available to users through an application store 160, with which tenant administrators or users 150 may interact. The various components of the ecosystem may interact over a cloud-based network 170.

The hosted service 122 may provide access to the infrastructure of the ecosystem through token generation 146 and directory service portal 148 within the directory service 140. The developer 120 may access the infrastructure through the structure application programming interfaces (APIs) 142. The structure APIs 142 ma provide access to a structure database (also known as graph database as opposed to relational databases). Graph databases employ nodes, properties, and edges. Nodes represent entities such as people, businesses, accounts, or any other item that is kept track of. Properties are pertinent information that relate to nodes. Edges are the lines that connect nodes to nodes or nodes to properties and they represent the relationship between the two. Substantive information is typically stored in the edges. Meaningful patterns may emerge when one examines the connections and interconnections of nodes, properties, and edges.

Web applications architecture 130 may also include structure (graph) adapters 132 that enable a rendering module or service 108 within file handler control 106 to interact with the web applications. File handler details may be specified in an application property in an application manifest. Manifest parser 134 may parse the manifest and enable execution of the application (also referred to as add-in) in conjunction with the web application. Thus, a user 102 may access the hosted service 122 and/or the rendering module/service through his/her browser or mobile application/system 104. The rendering module or service may access the workload 110 by providing activation parameters 112, which may activate the loopback token system 114.

File handler applications may be used to integrate non-native file types to the ecosystem allowing them to be handled similarly to native file types. Through the file handler applications, customized file icons, file preview in a browser, and rich view/edit capability (e.g., interactive features) may be enabled. New file creation of these file types may also be enabled through the suite of applications. A file handler may include a file handler endpoint, which is a cloud-hosted application that may provide preview and editing functionality for non-native file types and a file icon representing the file type in the web application. Thus, the file handler may include functional logic to preview, open, create, print, and save non-native files handled by the file handler. The file handler may use the directory service 140 to gain access to the web application ecosystem by registering with the directory service.

The file handler may be invoked with the openURl or previewUrl URLs specified in the application property of the application manifest at the directory service. For example, to open a non-native file, the web application may invoke the file handler by making a request to the URL specified in the previewUrl for the application manifest if there is a registered file handler for that file type. The web application may pass the file location, along with other details in the request. The previewUrl may point to a method in the file handler application that may retrieve a file stream for the file, and then use this stream to provide a preview of the file in the browser. For the open functionality, a similar process may be followed. The file handler endpoint may load the file stream into an appropriate editor, allowing the user to edit the non-native file. The application may also allow the user to save the non-native file by passing the updated file stream back to the file location, which may be specified in an activation parameter. The functionality may not be restricted to open and preview. It may also include other properties, like creating a new file, or printing a file, etc. In case of a new file, the file handler may use a template or start with an empty file and provide an edit experience to the user. In case of print, the file handler may use the file stream to generate a printable format that it provides the browser.

If more than one file handler is available for the same file type, the web application environment may optionally ask the user to select the desired file handler at runtime and optionally remember the choice as well. The manifest may declare multiple file types and associated icon/preview/edit/create URLs. The manifest may also declare multiple file types to use the same set of icon/preview/edit/create URLs for efficiency.

Activation parameters 112 may include, but are not limited to, a client parameter specifying a particular web application to open or preview a non-native file, a culture parameter specifying a culture name of a current thread for localization, a fileGet parameter to specify a full URL of an endpoint to retrieve the non-native file from by the web application, a filePut parameter specifying the full URL of the endpoint to save the non-native file within the ecosystem, a resourceID parameter to specify a URL of a particular tenant used to obtain the access token from the directory service, and a documentID parameter to specify a specific documents in order to allow the application to open multiple documents at the same time.

Figure 2:
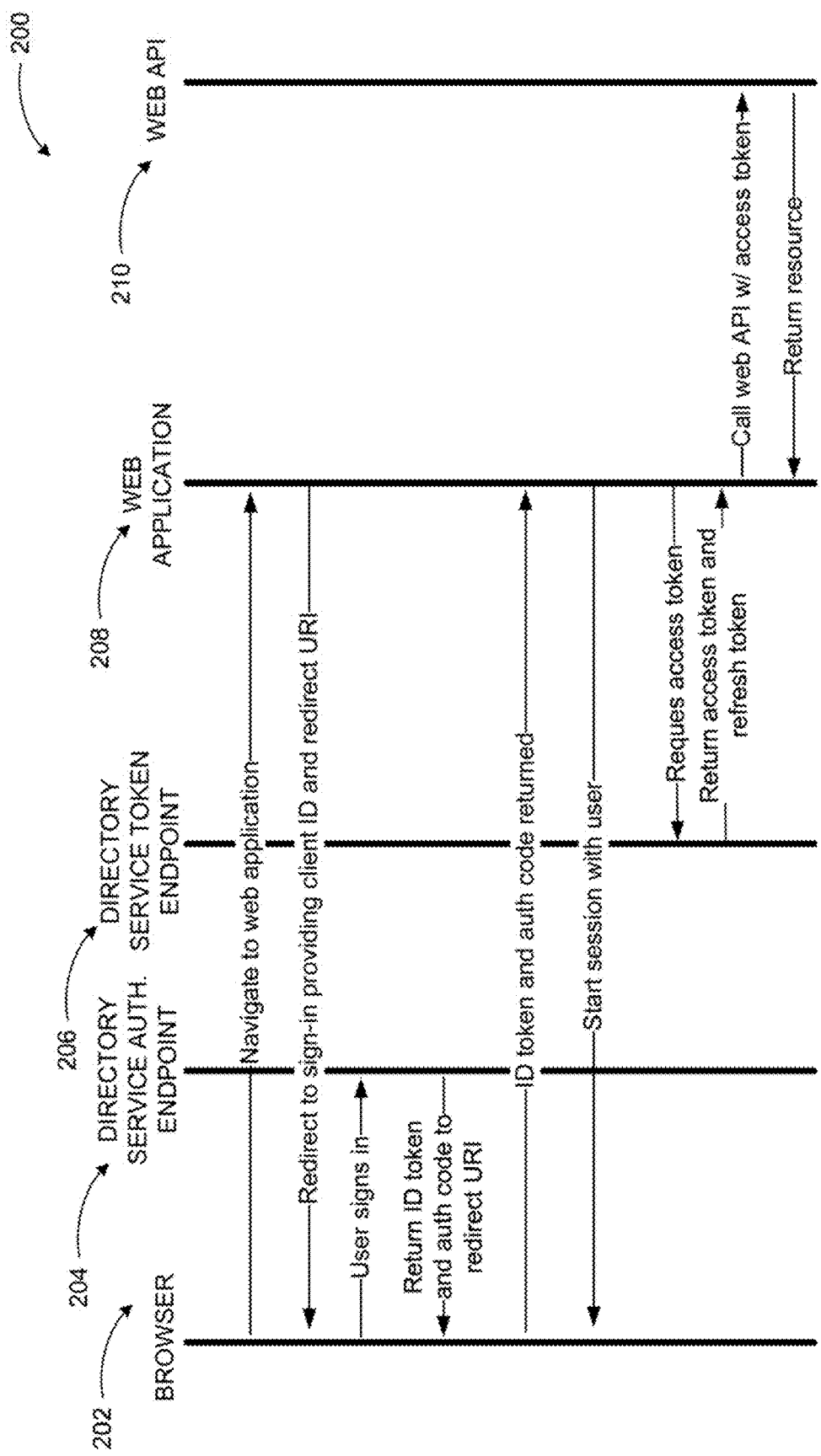
FIG. 2 illustrates a flow of actions for an example authorization process to provide support for non-native file types in web application environment.

FIG. 2 illustrates a flow of actions for an example authorization process to provide support for non-native file types in web application environment.

In some examples, a single sign-on (SSO) protocol may be followed to authorize the application use a non-native file. As shown in diagram 200, the interactions may begin with browser 202 navigating to the web application 208 and receiving a redirect to sign in and request authorization code by receiving a client identifier and a redirect URI. The user may sign in through the directory service authorization endpoint 204 and receive an ID token and authorization code to redirect URI. Next, the browser may return the ID token and the authorization code to the web application 208, which may start the session with the user.

The web application 208 may request and access token from the directory service token endpoint 206 by providing the authorization code, client ID, user credential, redirect URI, and an application ID URI. The web application may receive in return the access token and a refresh token. The web application 208 may then call the web API 210 with the access token (e.g., in the authorization header) and receive the requested resource. Workloads may use the embedded data in the URL and access token to provide constrained access to the file. A server may thus know that the application is the real application using the directory service token. The URL may not be misused by someone else because they would also need the directory service token (with a matching user name) which only the real application knows.

Some embodiments are directed to a mechanism to provide constrained file access to third party file handler applications. These constrained URLs may be passed as fileGet and filePut activation parameters to the file handler application. The workloads in a productivity suite may generate a special URL that contains following data embedded in it. File GUID—used to provide access to a single file only, as opposed to providing all files access; time stamp—used to expire the URL after a certain duration of time; user identifier—used to ensure that only the specified user can access the file using the URL; and application identifier—used to ensure that only the specified application can access the non-native file using the URL. It may also be possible to call other APIs allowed by the access token.

Figure 3:
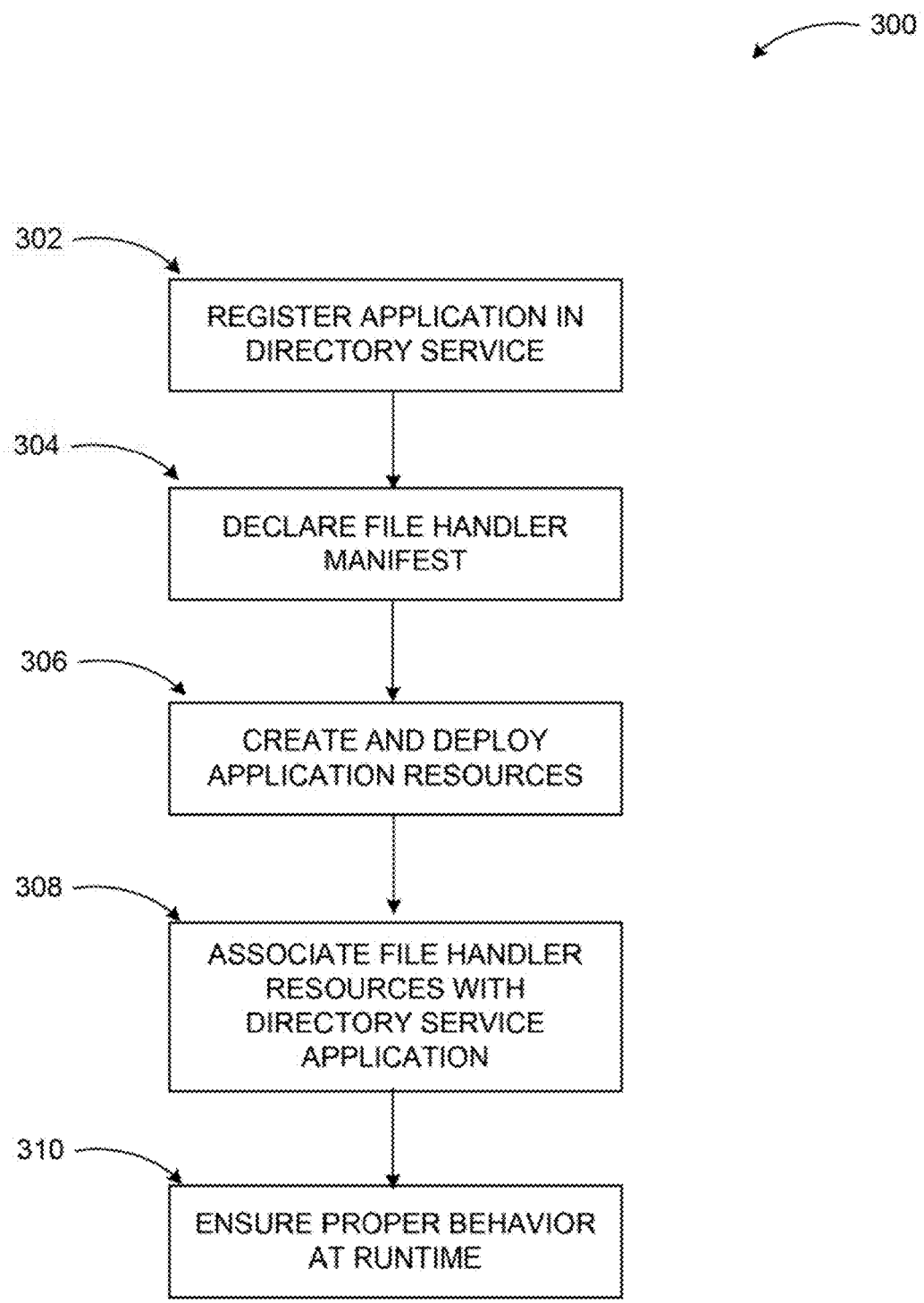
FIG. 3 illustrates major actions in an example file handler creation process.

FIG. 3 illustrates major actions in an example file handler creation process.

As shown in diagram 300, a file handler creation process may begin with registration of the application with the directory service 302 when a file handler manifest may be declared 304 with file handler properties. To register the application, a client ID and secret (authorization code) may be needed. Permissions may be granted through common consent in some examples. As mentioned herein, the manifest may include URLs for the resources to be called when the application is activated, file icon, file open resources, and file preview resources. Other example URLs may include new file, print, etc.

Next, the application resources may be created and deployed 306 and the file handler resources associated with the directory service application 308. Proper behavior of the application at runtime may also be ensured 310 before deployment. At runtime, a user may activate the non-native file from a document library or an attachment in an email, for example. The web application may post the activation parameters to the application's preview URL and obtain an access token if the application does not have an already cached directory service access token. The application may receive file data using the directory service token and a fileGet activation parameter. The application may generate a preview using the file's stream, and the user may be enabled to preview the non-native file inline with the web application's user experience.

Figure 4:
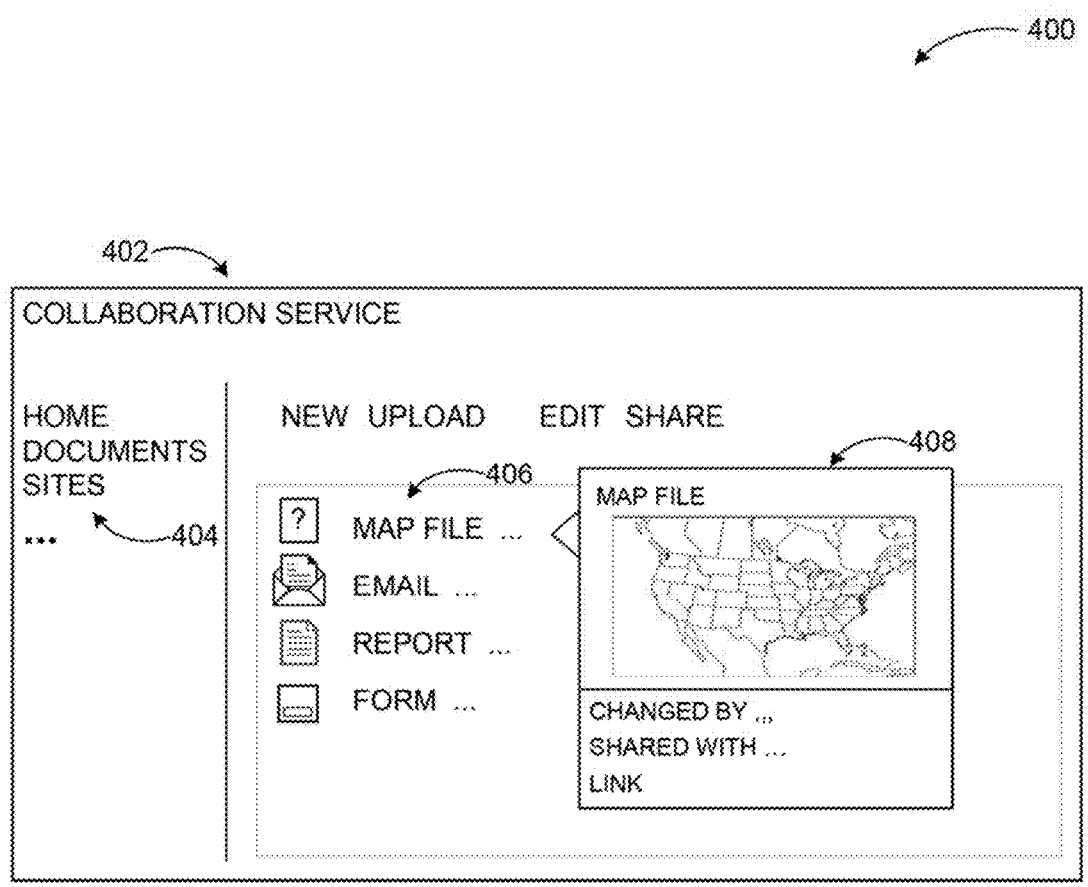
FIG. 4 illustrates an example implementation of support for non-native file types in web application environment on a collaboration service user interface.

FIG. 4 illustrates an example implementation of support for non-native file types in web application environment on a collaboration service user interface.

Diagram 400 shows a user experience 402 of a collaboration service that includes various locations 404 of available files or documents and a listing of files from a selected location. The listing of files includes a non-native file 406, which when selected results in a preview 408 (e.g., map) with interactive features and displayed metadata. The preview may be generated through the various processes described herein allowing the non-native file to be treated similar to native files of the collaboration service ecosystem. Thus, user experience may be enhanced by allowing users to see and interact with files of any type without manually having to install related applications, execute them, etc.

In some examples, actions may be taken for different formats, like open the file and look for images or call out to a web application, if no images are found. Once found an image associated with the non-native file may be stored alongside the document itself, so that when the document is updated or deleted the preview is removed (and re-generated if the preview is requested again after the document was updated). Different sizes of the preview may also be requested or an image may be received and the scaled to a needed size. Once the preview is generated image metadata may be stored in the search index so that next time the image is requested the cards can be scaled to lit the image aspect ratio, so that the cards are not uniform and a latency bit of re-generating the preview is taken every time. Also, multiple previews may be requested at the same time.

Following may be performed in order to generate non-native file thumbnails. An additional property may be added within file handlers that defines where applications are called to generate thumbnails. At some point during the thumbnail generation process, directory service may be called to check if the user has any file handlers that can generate previews. If a file handler exists, it may be treated as a source.

The examples provided in FIGS. 1 through 4 are illustrated with specific devices, applications, modules, and user interface configurations. Embodiments are not limited to environments according to these examples. Support for non-native file types in web application environment may be implemented in environments employing fewer or additional services, devices, applications, modules, and user interface configurations. Furthermore, the example devices, applications, modules, and user interface configurations shown in FIG. 1 through 4 may be implemented in a similar manner with other values using the principles described herein.

Figure 5:
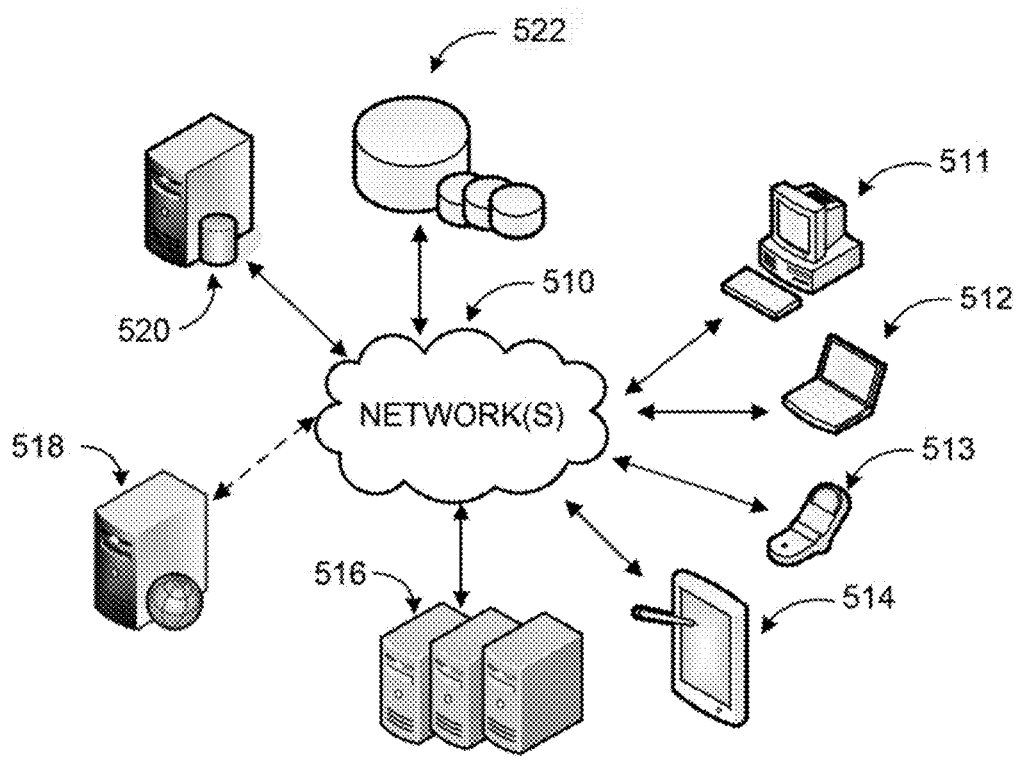
FIG. 5 is a networked environment, where a system according to embodiments may be implemented.

FIG. 5 is a simplified networked environment, where a system according to embodiments may be implemented. Support for non-native file types in web application environment may be implemented via software executed over one or more servers 516 such as a host application. The platform may communicate with client applications on individual computing devices such as a tablet 514, a smart phone 513, a laptop computer 515, or desktop computer 511 ('client devices') through network(s) 510.

Client applications executed on any of the client devices 511-514 may facilitate communications via application(s) executed by servers 516, or on individual server 518, in a system according to embodiments, applications may be created and registered to an online ecosystem and then execute within individual web applications such as productivity applications, communication applications, collaboration applications, and so on. The ecosystem may include one or more services and/or applications executed on servers 516 or web server 518. The non-native applications may be enabled to interact with files and provide custom experiences for a user accessing the ecosystem through browsers or client applications executed on client devices 511-514. The applications may also be enabled to interact with additional information discovered about the user within the ecosystem to provide custom experiences. The host application(s) may store data associated with the non-native files and applications in data store(s) 522 directly or through database server 520.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to implement support for non-native file types in web application environment. Furthermore, the networked environments discussed in FIG. 5 are for illustration purposes only. Embodiments are not limited to the example applications, modules, or processes.

Figure 6:
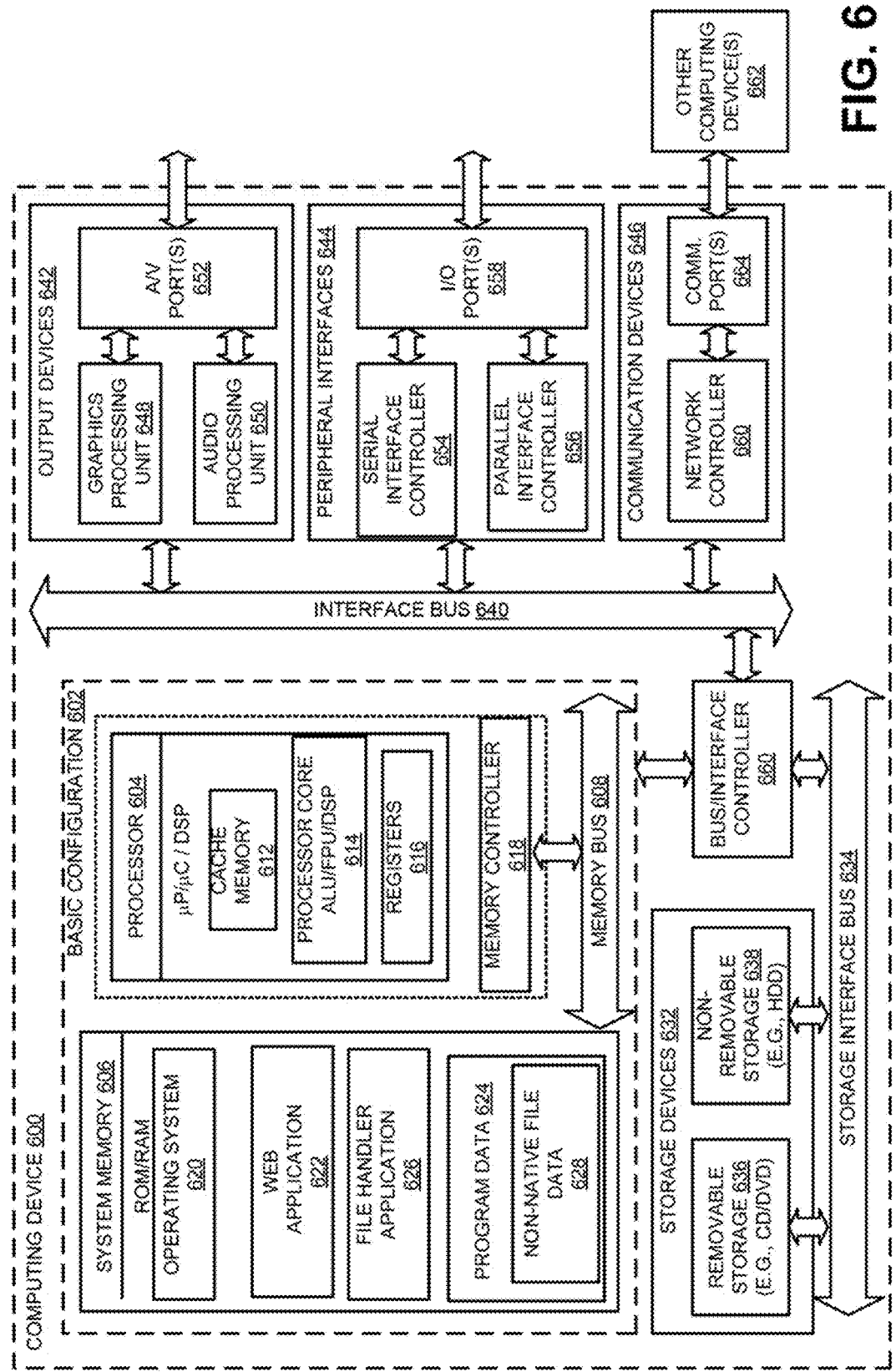
FIG. 6 is a block diagram of an example general purpose computing device, which may be used to provide support for non-native file types in web application environment.

FIG. 6 and the associated discussion are intended to provide a brief, general description of a general purpose computing device, which may be used to implement support for non-native file types in web application environment.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a web application 622, a file handler application 626, and program data 624. Through the file handler application 626, non-native applications may be created and registered to an online ecosystem and then execute within individual web applications such as web application 622. The program data 624 may include, among other data, non-native file data 628 related to the non-native files, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral, interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which ma be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, computing, devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed m such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to implement cross-platform command extensibility. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
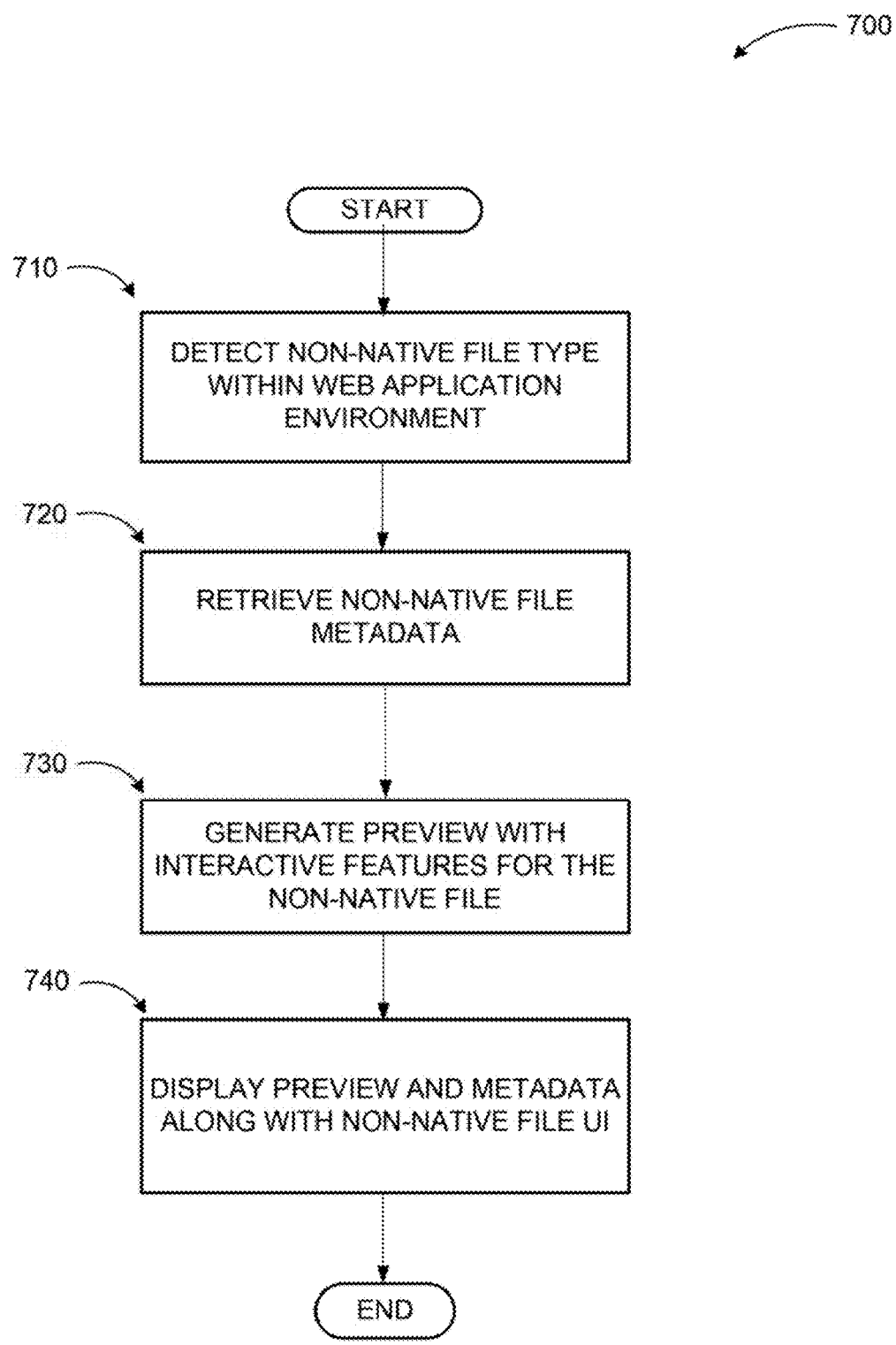
FIG. 7 illustrates a logic flow diagram of a method to provide support for non-native file types in web application environment, according to embodiments.

FIG. 7 illustrates a logic flow diagram for process 700 of a method to implement support for non-native file types in web application environment, according to embodiments. Process 700 may be implemented on a server or other system.

Process 700 begins with operation 710, where a non-native file type may be detected in a web application environment. For example, a user may click on a non-native file in a user interface listing available files or call the file through other means. At operation 720, non-native file metadata may be retrieved using a directory service associated with the web application's ecosystem and a preview generated by an application specified in the non-native file's metadata (e.g., manifest at the directory service) at operation 730. The preview may include interactive features. At operation 740, the preview may be displayed with the interactive features (and optionally the metadata) within the web application's user interface.

The operations included in process 700 are for illustration purposes. Support for non-native file types in web application environment may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a method to provide support for custom file types in a web application environment is described. The method may include detecting a non-native file within the web application environment retrieving metadata associated with the non-native file; generating a preview associated with the non-native file; and displaying the preview and the metadata along with the non-native file, where at least a portion of the preview is interactive.

According to other examples, the method may further include one or more of employing a file handler application to integrate the non-native file to the web application environment such that the non-native file is handled in a similar way to native files and enabling one or more of a customized file icon, a file preview in a browser, and one or more interactive features through the file handler application. The file handler application may include a file handler endpoint and a file icon.

According to further examples, the file handler endpoint may be a cloud-hosted application configured to provide preview and editing functionality for the non-native file and the file icon represents the non-native file in the web application. The file handler application may include functional logic to preview, open, create, print, and save non-native file types handled by the file handler application. The file handler application may be configured to gain access to the web application environment by registering with a directory service of the web application environment.

According to yet other examples, the method may also include invoking the file handler application by making a request to a location specified in a previewURL for a file handler application manifest if there is a registered file handler application for the non-native file. The previewURL may point to a method in the file handler application configured to retrieve a file stream for the non-native file and use the file stream to provide a preview of the non-native file within the web application. The method may further include invoking the file handler application by making a request to a location specified in an openURL for a file handler application manifest if there is a registered file handler application for the non-native file. Upon invocation with the openURL, the file handler endpoint may load a file stream into an editor associated with the non-native file and enable a user to edit the non-native file.

According to other examples, a system to provide support for custom file types in a web application environment is described. The system may include a first physical server configured to execute a web application; a second physical server configured to execute a directory service associated with the web application environment; and a third physical server. The third physical server may be configured to execute a file handler application associated with a non-native file within the web application environment, where the file handler application includes a file handler endpoint and a file icon, the file handler endpoint is a cloud-hosted application configured to provide preview and editing functionality for the non-native file, the file icon represents the non-native file in the web application, and the file handler application is used to integrate the non-native file to the web application environment such that the non-native file is handled in a similar way to native files.

According to some examples, one or more activation parameters may be used to invoke the file handler application, the one or more activation parameters including a client parameter to specify a particular web application to open or preview the non-native file, a culture parameter to specify a culture name of a current thread for localization, a fileGet parameter to specify a full URL of an endpoint to retrieve the non-native file by the web application, a filePut parameter to specify the full URL of the endpoint to save the non-native file within the web application environment, a resourceID parameter to specify a URL of a particular tenant used to obtain an access token from the directory service, and a documentID parameter to specify documents in order to allow the web application to open multiple documents at the same time.

According to further examples, a workload may be used to provide constrained access to the non-native file by using data embedded in a URI associated with invoking the file handler application and an access token. The data embedded in the URL may include one or more of a file identifier to provide access to the non-native file, a time stamp to expire the URL after a predefined duration of time, a user identifier to ensure that a specified user has access to the non-native file using the URL, and an application identifier to ensure that the web application has access to the non-native file using the URL.

According to other examples, the file handler application may be registered with the directory service and a file handler manifest containing file handler application properties may be declared. The directory service may use a client identifier and an authorization code to register the file handler application. The manifest may include one or more URLs for resources to be called when the file handler application is activated, a file icon, one or more file open resources, and one or more file preview resources.

According to further examples, a computer-readable memory device with instructions stored thereon to provide support for custom file types in a web application environment is described. The instructions may include registering a file handler application with a directory service associated with the web application environment, where the file handler application is used to integrate a non-native file to the web application environment such that the non-native file is handled in a similar way to native files; declaring a file handler manifest that includes one or more file handler application properties; creating and deploying one or more file handler application resources associated with previewing, opening, creating, printing, and saving the non-native file; and associating the one or more file handler application resources with the directory service.

According to yet other examples, the instructions may also include enabling request and delivery of multiple previews of the non-native file at the same time.

The above specification, examples and data provide a complete description of the manufacture, and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide support for custom file types in a web application environment, the method comprising:
  registering a file handler application with a directory service associated with the web application environment;
  declaring a file handler manifest comprising a file handler application property upon registration of the file handler application;
  detecting a non-native file within the web application environment;
  responsive to a determination that the file handler application supports a type of the non-native file, retrieving metadata associated with the non-native file by making a request to a URL specified in the file handler application property to point to a method in the file handler application configured to retrieve a file stream for the non-native file;

generating a preview associated with the non-native file based on the file stream retrieved; and displaying the preview and the metadata along with the non-native file.

2. The method of claim 1, further comprising:
employing the file handler application to integrate the non-native file to the web application environment such that the non-native file is handled in a similar way to native files.

3. The method of claim 1, further comprising:
enabling one or more of a customized file icon, a file preview in a browser, and one or more interactive features through the file handler application.

4. The method of claim 1, wherein the file handler application includes a file handler endpoint and a file icon.

5. The method of claim 4, wherein the file handler endpoint is a cloud-hosted application configured to provide preview and editing functionality for the non-native file and the file icon represents the non-native file in the web application.

6. The method of claim 1, wherein the file handler application includes functional logic to preview, open, create, print, and save non-native file types handled by the file handler application.

7. The method of claim 1, wherein registering the file handler application with the directory service of the web application environment enables the file handler application to gain access to the web application environment.

8. The method of claim 1, wherein the URL specified in the file handler application property is a previewURL, and the method further comprises:
responsive to the determination that the file handler application supports the type of the non-native file, retrieving metadata associated with the non-native file by making a request to a location specified in the previewURL.

9. The method of claim 8, wherein the previewURL, points to a method in the file handler application configured to retrieve the file stream for the non-native file and use the file stream to generate the preview of the non-native file for display within the web application.

10. The method of claim 1, wherein the URL specified in the file handler application property is an openURL and the method further comprises:
responsive to the determination that the file handler application supports the type of the non-native file, retrieving metadata associated with the non-native file by making a request to a location specified in the openURL.

11. The method of claim 10, wherein upon invocation with the openURL, the file handler endpoint loads a file stream into an editor associated with the non-native file and enables a user to edit the non-native file.

12. A system to provide support for custom file types in a web application environment, the system comprising:
a first physical server configured to execute a web application;
a second physical server configured to execute a directory service associated with the web application environment; and
a third physical server configured to execute a file handler application associated with a non-native file within the web application environment, the file handler application used to integrate the non-native file to the web application environment such that the non-native file is handled in a similar way to native files, wherein the third physical server comprises:

a communication interface configured to facilitate communication between the third physical server and the first physical server and between the third physical server and the second physical server;
a memory configured to store instructions; and
a processor coupled to the communication interface and the memory, wherein the processor is configured to:
register the file handler application with the directory service associated with the web application environment;
declare a file handler manifest comprising a file handler application property upon registration of the file handler application;
detect the non-native file within the web application environment;
responsive to a determination that the file handler application supports a tope of the non-native file, retrieve metadata associated with the non-native file by making a request to a URL, specified in the file handler application property to point to a method in the file handler application configured to retrieve a file stream for the non-native file;
generate a preview associated with the non-native file based on the file stream retrieved; and
display the preview and the metadata along with the non-native file.

13. The system of claim 12, wherein one or more activation parameters are used to invoke the file handler application, the one or more activation parameters including a client parameter to specify a particular web application to open or preview the non-native file, a culture parameter to specify a culture name of a current thread for localization, a fileGet parameter to specify a full URL of an endpoint to retrieve the non-native file by the web application, a filePut parameter to specify the full URL of the endpoint to save the non-native file within the web application environment, a resourceID parameter to specify a URL of a particular tenant used to obtain an access token from the directory service, and a documentID parameter to specify documents in order to allow the web application to open multiple documents at the same time.

14. The system of claim 12, wherein a workload is used to provide constrained access to the non-native file by using data embedded in the URL specified in the file handler application property and an access token.

15. The system of claim 14, wherein the data embedded in the URL includes one or more of a file identifier to provide access to the non-native file, a time stamp to expire the URL after a predefined duration of time, a user identifier to ensure that a specified user has access to the non-native file using the URL, and an application identifier to ensure that the web application has access to the non-native file using the URL.

16. The system of claim 12, wherein the directory service uses a client identifier and an authorization code to register the file handler application.

17. The system of claim 12, wherein the file handler manifest includes one or more URLs for resources to be called when the file handler application is activated, a file icon, one or more file open resources, and one or more file preview resources.

18. A computer-readable memory device with instructions stored thereon to provide support for custom file types in a web application environment, the instructions comprising:
registering a file handler application with a directory service associated with the web application environment, wherein the file handler application is used to integrate a non-native file to the web application environment such that the non-native file is handled in a similar way to native files;

declaring a file handler manifest comprising a file handler application property upon registration of the file handler application;

detecting the non-native file within the web application environment;

responsive to a determination that the file handler application supports a type of the non-native file, retrieving metadata associated with the non-native file by making a request to a URL specified in the file handler application property to point to a method in the file handler application configured to retrieve a file stream for the non-native file;

generating a preview associated with the non-native file based on the file stream retrieved; and displaying the preview and the metadata along with the non-native file.

19. The computer-readable memory device of claim 18, wherein the instructions further comprise:

enabling request and delivery of multiple previews of the non-native file at the same time.

* * * * *